(12) United States Patent
Stager et al.

(10) Patent No.: US 7,454,529 B2
(45) Date of Patent: Nov. 18, 2008

(54) PROTECTABLE DATA STORAGE SYSTEM AND A METHOD OF PROTECTING AND/OR MANAGING A DATA STORAGE SYSTEM

(75) Inventors: Roger Keith Stager, Livermore, CA (US); Don Alvin Trimmer, Livermore, CA (US); Rico Blaser, San Francisco, CA (US)

(73) Assignee: Netapp, Inc., Sunnyvale, CA (US)

( * ) Notice: Subject to any disclaimer, the term of this patent is extended or adjusted under 35 U.S.C. 154(b) by 675 days.

(21) Appl. No.: 10/211,920

(22) Filed: Aug. 2, 2002

(65) Prior Publication Data

US 2004/0024919 A1 Feb. 5, 2004

(51) Int. Cl.
G06F 3/00 (2006.01)
G06F 13/00 (2006.01)

(52) U.S. Cl. .............................. 710/8; 710/15; 710/18; 713/300; 713/310

(58) Field of Classification Search ................. 713/300, 713/310, 320, 323, 324, 330; 710/8, 15, 710/18
See application file for complete search history.

(56) References Cited

U.S. PATENT DOCUMENTS

| | | | |
|---|---|---|---|
| 4,635,145 A * | 1/1987 | Horie et al. .............. 360/78.04 |
| 4,727,512 A | 2/1988 | Birkner et al. | |
| 4,775,969 A | 10/1988 | Osterlund | |
| 5,235,695 A | 8/1993 | Pence | |
| 5,297,124 A | 3/1994 | Plotkin et al. | |
| 5,438,674 A | 8/1995 | Keele et al. | |
| 5,455,926 A | 10/1995 | Keele et al. | |
| 5,485,321 A | 1/1996 | Leonhardt et al. | |
| 5,666,538 A | 9/1997 | DeNicola | |
| 5,673,382 A | 9/1997 | Cannon et al. | |
| 5,774,292 A | 6/1998 | Georgiou et al. | |
| 5,774,643 A | 6/1998 | Lubbers et al. | |
| 5,774,715 A | 6/1998 | Madany et al. | |
| 5,805,864 A | 9/1998 | Carlson et al. | |
| 5,809,511 A | 9/1998 | Peake | |
| 5,809,543 A | 9/1998 | Byers et al. | |
| 5,854,720 A | 12/1998 | Shrinkle et al. | |
| 5,864,346 A | 1/1999 | Yokoi et al. | |

(Continued)

FOREIGN PATENT DOCUMENTS

EP 1333379 4/2006

(Continued)

OTHER PUBLICATIONS

"Alacritus Software's Securitus I: Pointing the Way to Virtual Tape Libraries" Aberdeen Group, Inc., Mar. 2002.

(Continued)

Primary Examiner—Tariq R. Hafiz
Assistant Examiner—Scott Sun
(74) Attorney, Agent, or Firm—Perkins Coie LLP

(57) ABSTRACT

A method of protecting a data storage system including the steps of: providing a disk system including a plurality of disk modules, each disk module containing a disk controller and a disk driver, the disk driver being in detachable electrical communication with the disk controller; and physically disconnecting the disk controller from the disk driver for any of the plurality of disk modules that are not required by the data storage system for the transfer of data.

27 Claims, 1 Drawing Sheet

U.S. PATENT DOCUMENTS

| | | | |
|---|---|---|---|
| 5,872,669 A * | 2/1999 | Morehouse et al. | 360/69 |
| 5,875,479 A | 2/1999 | Blount et al. | |
| 5,911,779 A | 6/1999 | Stallmo et al. | |
| 5,949,970 A | 9/1999 | Sipple et al. | |
| 5,961,613 A | 10/1999 | DeNicola | |
| 5,963,971 A | 10/1999 | Fosler et al. | |
| 5,974,424 A | 10/1999 | Schmuck et al. | |
| 6,021,408 A | 2/2000 | Ledain et al. | |
| 6,023,709 A | 2/2000 | Anglin et al. | |
| 6,029,179 A | 2/2000 | Kishi | |
| 6,041,329 A | 3/2000 | Kishi | |
| 6,044,442 A | 3/2000 | Jesionowski | |
| 6,049,848 A | 4/2000 | Yates et al. | |
| 6,061,309 A | 5/2000 | Gallo et al. | |
| 6,067,587 A | 5/2000 | Miller et al. | |
| 6,070,224 A | 5/2000 | LeCrone et al. | |
| 6,098,148 A | 8/2000 | Carlson | |
| 6,128,698 A | 10/2000 | Georgis | |
| 6,131,142 A | 10/2000 | Kamo et al. | |
| 6,131,148 A | 10/2000 | West et al. | |
| 6,163,856 A | 12/2000 | Dion et al. | |
| 6,173,359 B1 | 1/2001 | Carlson et al. | |
| 6,195,730 B1 | 2/2001 | West | |
| 6,225,709 B1 * | 5/2001 | Nakajima | 307/66 |
| 6,247,096 B1 | 6/2001 | Fisher et al. | |
| 6,260,110 B1 | 7/2001 | LeCrone et al. | |
| 6,266,784 B1 | 7/2001 | Hsiao et al. | |
| 6,269,423 B1 | 7/2001 | Kishi | |
| 6,269,431 B1 | 7/2001 | Dunham | |
| 6,282,609 B1 | 8/2001 | Carlson | |
| 6,289,425 B1 | 9/2001 | Blendermann et al. | |
| 6,292,889 B1 | 9/2001 | Fitzgerald et al. | |
| 6,301,677 B1 | 10/2001 | Squibb | |
| 6,304,880 B1 | 10/2001 | Kishi | |
| 6,304,882 B1 | 10/2001 | Strellis et al. | |
| 6,317,814 B1 | 11/2001 | Blendermann et al. | |
| 6,324,497 B1 | 11/2001 | Yates et al. | |
| 6,327,418 B1 | 12/2001 | Barton | |
| 6,336,163 B1 | 1/2002 | Brewer et al. | |
| 6,336,173 B1 | 1/2002 | Day et al. | |
| 6,339,778 B1 | 1/2002 | Kishi | |
| 6,341,329 B1 | 1/2002 | LeCrone et al. | |
| 6,343,342 B1 | 1/2002 | Carlson | |
| 6,353,837 B1 | 3/2002 | Blumenau | |
| 6,360,232 B1 | 3/2002 | Brewer et al. | |
| 6,389,503 B1 | 5/2002 | Georgis et al. | |
| 6,408,359 B1 | 6/2002 | Ito et al. | |
| 6,487,561 B1 | 11/2002 | Ofek et al. | |
| 6,496,791 B1 | 12/2002 | Yates et al. | |
| 6,499,026 B1 | 12/2002 | Rivette et al. | |
| 6,557,073 B1 | 4/2003 | Fujiwara | |
| 6,557,089 B1 | 4/2003 | Reed et al. | |
| 6,578,120 B1 | 6/2003 | Crockett et al. | |
| 6,615,365 B1 | 9/2003 | Jenevein et al. | |
| 6,625,704 B2 | 9/2003 | Winokur | |
| 6,654,912 B1 | 11/2003 | Viswanathan et al. | |
| 6,658,435 B1 | 12/2003 | McCall | |
| 6,694,447 B1 | 2/2004 | Leach et al. | |
| 6,725,331 B1 | 4/2004 | Kedem | |
| 6,766,520 B1 | 7/2004 | Rieschl et al. | |
| 6,779,057 B2 | 8/2004 | Masters et al. | |
| 6,779,058 B2 | 8/2004 | Kishi et al. | |
| 6,779,081 B2 | 8/2004 | Arakawa et al. | |
| 6,816,941 B1 | 11/2004 | Carlson et al. | |
| 6,816,942 B2 | 11/2004 | Okada et al. | |
| 6,834,324 B1 | 12/2004 | Wood | |
| 6,850,964 B1 | 2/2005 | Brough et al. | |
| 6,877,016 B1 | 4/2005 | Hart et al. | |
| 6,915,397 B2 | 7/2005 | Lubbers et al. | |
| 6,931,557 B2 * | 8/2005 | Togawa | 713/323 |
| 6,950,263 B2 * | 9/2005 | Suzuki et al. | 360/69 |
| 6,957,291 B2 | 10/2005 | Moon et al. | |
| 6,973,369 B2 | 12/2005 | Trimmer et al. | |
| 6,973,534 B2 | 12/2005 | Dawson | |
| 6,978,325 B2 | 12/2005 | Gibble | |
| 7,032,126 B2 | 4/2006 | Zalewski et al. | |
| 7,032,131 B2 | 4/2006 | Lubbers et al. | |
| 7,055,009 B2 | 5/2006 | Factor et al. | |
| 7,072,910 B2 | 7/2006 | Kahn et al. | |
| 7,096,331 B1 | 8/2006 | Haase et al. | |
| 7,100,089 B1 | 8/2006 | Phelps | |
| 7,107,417 B2 | 9/2006 | Gibble et al. | |
| 7,111,136 B2 | 9/2006 | Yamagami | |
| 7,127,388 B2 | 10/2006 | Yates et al. | |
| 7,127,577 B2 | 10/2006 | Koning et al. | |
| 7,143,307 B1 | 11/2006 | Witte et al. | |
| 7,152,077 B2 | 12/2006 | Veitch et al. | |
| 7,155,586 B1 | 12/2006 | Wagner et al. | |
| 7,200,546 B1 | 4/2007 | Nourmohamadian et al. | |
| 2001/0047447 A1 | 11/2001 | Katsuda | |
| 2002/0004835 A1 | 1/2002 | Yarbrough | |
| 2002/0016827 A1 | 2/2002 | McCabe et al. | |
| 2002/0026595 A1 * | 2/2002 | Saitou et al. | 713/300 |
| 2002/0095557 A1 * | 7/2002 | Constable et al. | 711/163 |
| 2002/0133491 A1 | 9/2002 | Sim et al. | |
| 2002/0144057 A1 * | 10/2002 | Li et al. | 711/112 |
| 2002/0163760 A1 | 11/2002 | Lindsey et al. | |
| 2002/0166079 A1 | 11/2002 | Ulrich et al. | |
| 2002/0171546 A1 * | 11/2002 | Evans et al. | 340/540 |
| 2002/0199129 A1 * | 12/2002 | Bohrer et al. | 714/7 |
| 2003/0004980 A1 | 1/2003 | Kishi et al. | |
| 2003/0037211 A1 | 2/2003 | Winokur | |
| 2003/0097462 A1 | 5/2003 | Parent et al. | |
| 2003/0120476 A1 | 6/2003 | Yates et al. | |
| 2003/0120676 A1 | 6/2003 | Holavanahalli et al. | |
| 2003/0126388 A1 | 7/2003 | Yamagami | |
| 2003/0135672 A1 | 7/2003 | Yip et al. | |
| 2003/0149700 A1 | 8/2003 | Bolt | |
| 2003/0182301 A1 | 9/2003 | Patterson et al. | |
| 2003/0182350 A1 | 9/2003 | Dewey | |
| 2003/0188208 A1 * | 10/2003 | Fung | 713/320 |
| 2003/0217077 A1 | 11/2003 | Schwartz et al. | |
| 2003/0225800 A1 | 12/2003 | Kavuri | |
| 2004/0015731 A1 * | 1/2004 | Chu et al. | 713/300 |
| 2004/0098244 A1 | 5/2004 | Dailey et al. | |
| 2004/0181388 A1 | 9/2004 | Yip et al. | |
| 2004/0181707 A1 | 9/2004 | Fujibayashi | |
| 2005/0010529 A1 | 1/2005 | Zalewski et al. | |
| 2005/0044162 A1 | 2/2005 | Liang et al. | |
| 2005/0063374 A1 | 3/2005 | Rowan et al. | |
| 2005/0065962 A1 | 3/2005 | Rowan et al. | |
| 2005/0066118 A1 | 3/2005 | Perry et al. | |
| 2005/0066222 A1 | 3/2005 | Rowan et al. | |
| 2005/0066225 A1 | 3/2005 | Rowan et al. | |
| 2005/0076070 A1 | 4/2005 | Mikami | |
| 2005/0076261 A1 | 4/2005 | Rowan et al. | |
| 2005/0076262 A1 | 4/2005 | Rowan et al. | |
| 2005/0076264 A1 | 4/2005 | Rowan et al. | |
| 2005/0144407 A1 | 6/2005 | Colgrove et al. | |
| 2006/0047895 A1 | 3/2006 | Rowan et al. | |
| 2006/0047902 A1 | 3/2006 | Passerini | |
| 2006/0047903 A1 | 3/2006 | Passerini | |
| 2006/0047905 A1 | 3/2006 | Matze et al. | |
| 2006/0047925 A1 | 3/2006 | Passerini | |
| 2006/0047989 A1 | 3/2006 | Delgado et al. | |
| 2006/0047998 A1 | 3/2006 | Darcy | |
| 2006/0047999 A1 | 3/2006 | Passerini et al. | |
| 2006/0143376 A1 | 6/2006 | Matze et al. | |

FOREIGN PATENT DOCUMENTS

| | | |
|---|---|---|
| EP | 1 671 231 | 6/2006 |
| EP | 1 671231 | 6/2006 |
| WO | WO99/03098 | 1/1999 |

| WO | WO99/06912 | 2/1999 |
| WO | WO2005/031576 | 4/2005 |
| WO | WO2006/023990 | 3/2006 |
| WO | WO2006/023991 | 3/2006 |
| WO | WO2006/023992 | 3/2006 |
| WO | WO2006/023993 | 3/2006 |
| WO | WO2006/023994 | 3/2006 |
| WO | WO2006/023995 | 3/2006 |

OTHER PUBLICATIONS

"Product Brief: Rhapsody/Alacritus-Securitus/XPath Virtual Tape in the Fabric" The Enterprise Storage Group, Aug. 2002.

"Alacritus Software Announces Securitus I, The Industry's First Virual Tape Library Solution: Securitus I Heralds Advent of 'Disruptive Tehcnology' that Serves as Replacement to Tape Libraries" Alacritus Software, Inc., Jun. 25, 2001.

"Alacritus, Hitachi CP and Nissho Team to Create Virtual Tape Library Appliance: Industry's First Virtual Tape Library Appliance to Replace Storage Tape Libraries" Alacritus Software, Inc. Jun. 25, 2001.

"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library" Alacritus Software, Inc., Oc. 3, 2001.

Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.

"Alacritus Software Announces Virtual Tape Library for Legato NetWorker Data Protection Solution" Alacritus Software, Inc., Jan. 8, 2002.

"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002.

"Alacritus Software FAQs" Alacritus Software, Inc., Jul. 2001.

"Disk-Based Data Protection" Alacritus Software, Inc., Jul. 2001.

"Virtual Tape Library Technology Brochure" Alacritus Software, Inc., Jul. 2001.

"Disk-Based Data Protection" Alacritus Software, Inc., Sep. 2001.

"Alacritus Software and Rhapsody Networks to Develop Breakthrough Backup Solutions for Storage networks: Companies to Provide First Network-Intelligent Virtual Tape Solution Resulting in Dramatic ROI, Increases in Data Backup performance and Scalability" Alacritus Software, Jul. 8, 2002.

Camphuisen, Alicia, "Hitachi Inks OEM Deal with Legato" Knapp Comm., Jul. 17, 2002.

Biggar, Heidi, "Alacritus Enables Disk-Based Backup" InfoStor, Sep. 2001.

"Securitus I White Paper: Disk Based Data Protection for Alacritus Software" Alacritus Software, Inc., Jul. 2001.

Biggar, Heidi, "Disk and Tape Forge New Partnership in Backup Arena" InforStor, Nov. 2001.

Preston, W. Curtis, "Suprise! Cheap Disks Cure Slow Backup" Storage Magazine, Jun. 1, 2002.

"Alacritus, Hitachi CP and Nissho Team to Create Virtual Tape Library" internetnews.com, Jun. 25, 2001.

"Alacritus Software and Rhapsodiy Networks to Develop Breakthrough Backup Solutions for Storage Networks: Companies to Provide First Network-Intelligent Virtual Tape Solution Resulting in Dramatic ROI, Increases in Data Backup performance and Scalability" Alacritus Software, Jul. 8, 2002.

"Disk-Based Data Protection" Alacritus Software, Inc., Ju. 2001.

Biggar, Heidi, "Disk and Tape Forge New Parnership in Backup Arena" InfoStor, Nov. 2001.

Preston, W. Curtis, "Surprise! Cheap Disks Cure Slow Backup" Storage Magazine, Jun. 1, 2002.

"Alacritus Announces Disk-Based Successor to Tape" Knapp Comm., Aug. 21, 2002.

"Virtual Tape Library Technology Brochure" Alacitus Software, Inc., Jul. 2001.

Disk-Based Data Protectoin Alacritus Software, Inc., Jul. 2001.

* cited by examiner

PROTECTABLE DATA STORAGE SYSTEM AND A METHOD OF PROTECTING AND/OR MANAGING A DATA STORAGE SYSTEM

BACKGROUND

Traditionally, tapes have been used as the primary storage medium for backup and archival data. To automate the mounting and dismounting of tapes into tape drives, many organizations use a robotically controlled tape library (or tape jukebox).

Actual usage of individual tape media is generally very small and infrequent. Backup jobs typically run at night during a period called the "backup window". Most sites aim to limit the backup window to a small number of hours which is considered to be a short period of time.

Typical sites use tape rotation schemes whereby they write to daily tapes, weekly tapes and monthly tapes. Most tapes are sent off-site after being written to, and are not accessed again until either a restore is required (very infrequent) or the data on the tape has expired (usually after some number of weeks, months or even years). The result is that for most of the time, the majority of tapes are not accessed at all.

Instead of using a traditional tape drive or tape library, an organization can use a "virtual tape library". A virtual tape library is similar to a physical tape library except that the data is stored on disk instead of tape. Existing virtual tape library solutions make use of a regular disk subsystem for storage.

Disk subsystems have completely different patterns to tape media. For example, disk subsystems in large organizations are accessed twenty-four (24) hours a day, seven (7) days a week. Most smaller organizations typically leave their fileservers powered on twenty-four (24) hours a day. Many applications (e.g. email and web services) need to be available twenty-four (24) hours a day for proper operation. Essentially, most disk subsystems are designed for frequent and sometimes continuous access.

When used with virtual tape library systems, disk subsystems suffer unnecessarily from the following problems: 1) they consume excessive amounts of power as all disks are left powered on at all times even though only a very small number are needed at any one time; 2) the long power on hours lead to failure caused by head movement, continuous disk spinning and thermal aging; and 3) the continuously energized disks are potentially at risk of being subjected to power surges which could harm or destroy the stored data.

As an example, disk drives in laptop computer systems consume a significant amount of power when in operation. For example, a two point five (2.5 in.) inch disk drive may consume up to thirty (30%) percent of total system power, while a one point eight (1.8 in.) inch drive may consume up to twenty (20%) percent. Accordingly, many laptop disk drives implement an electronic power down mode that is used to conserve battery power. However, this electronic power down mode fails to physically isolate the laptop disk drive such that the disk drive is protected against surges and viral attack.

Clearly what is needed is a protectable data storage system that physically isolates disks not being accessed by the system and thus eliminates damage from power surges and viral attacks; that provides improved disk reliability; that produces a reduced amount of thermal stress and produces less wear on the disk drive bearings; that allows an increased number of disks to be housed in a given volume of space; and that reduces energy costs due to improved operating efficiency.

SUMMARY

One embodiment of the present invention is directed to a protectable data storage system. The system includes a disk system having a plurality of disk modules. Each disk module includes a disk, a disk driver and a disk controller. Each disk module receives a conduit that supplies power and/or digital data to the disk module. The disk controller regulates the power and/or digital data supplied to the disk module. A connector mechanism is disposed in at least one of the plurality of disk modules between the disk controller and the disk driver. The connector mechanism is capable of establishing electrical communication between the disk controller and the disk driver, and is moveable between a first position, in which the disk controller and the disk driver are in electrical communication, and a second position, in which the disk controller is physically disconnected from the disk driver. The second position prevents power and/or digital data from reaching the disk driver and prevent data from being transferred between the disk and the conduit.

A separate embodiment of the present invention is directed to a protectable data storage system. The system includes a disk system for storing data. A central controller regulates the disk system and is in detachable electrical communication with the disk system via a system conduit. A connector mechanism is disposed on the system conduit between the disk system and the central controller. The connector mechanism is capable of establishing electrical communication between the disk system and the central controller. The connector mechanism is moveable between a first position, in which the disk system and the central controller are in electrical communication, and a second position, in which the disk system is physically disconnected from the central controller; thereby preventing signals from being received by the disk system.

A separate embodiment of the present invention is directed to a method of protecting and managing the power consumption of a data storage system. The method includes: providing a disk system including a plurality of disk modules, each disk module contains a disk controller and a disk driver, the disk driver is in detachable electrical communication with the disk controller; and physically disconnecting the disk controller from the disk driver for any of the plurality of disk modules that are not required by the data storage system for the transfer of data.

A separate embodiment of the present invention is directed to a method of protecting a data storage system. The method includes: providing a disk system; providing a central controller in detachable electrical communication with the disk system to regulate power and/or data transferred to the disk system; and disconnecting the disk system from the central controller when data transfer to and/or from the disk system is not needed.

In a separate embodiment, the present invention is directed to a protectable data storage system. The system includes a disk system for storing data. A central controller regulates the disk system and is in electrical communication with the disk system. At least one storage system conduit is in electrical communication with the disk system for transferring data to and/or from the protectable data storage system. At least one connector mechanism is disposed on the at least one storage system conduit. The at least one connector mechanism is capable of establishing electrical communication to and/or from the protectable data storage system. The at least one connector mechanism is moveable between a first position, in which electrical communication to and/or from the protectable data storage system is possible, and a second position, in which the protectable data storage system is physically isolated to prevent electrical communication to and/or from the protectable data storage system.

In a separate embodiment, the present invention is directed to a method of protecting a data storage system. The method includes: providing a data storage system having a disk system, a central controller, and at least one storage system conduit for transferring data to and/or from the data storage system; and physically isolating the data storage system preventing data transfer to and/or from the data storage system by creating a physical gap in the at least one storage system conduit.

BRIEF DESCRIPTION OF THE DRAWINGS

The foregoing summary, as well as the following detailed description of the preferred embodiments of the invention, will be better understood when read in conjunction with the appended drawings. For the purpose of illustrating the invention, there are shown in the drawings, embodiments which are presently preferred. It is understood, however, that the invention is not limited to the precise arrangements and instrumentalities shown. In the drawings.

DETAILED DESCRIPTION OF THE PREFERRED EMBODIMENTS

The term "connector mechanism," as used in the claims and in the corresponding portions of this specification, means "any device capable of physically detaching an electrical conduit, such as solenoid, a physical switching mechanism, or the like." The words "a" and "one," as used in the specification and claims are specifically defined to include one or more of the referenced item unless specifically stated otherwise.

Figure 1:
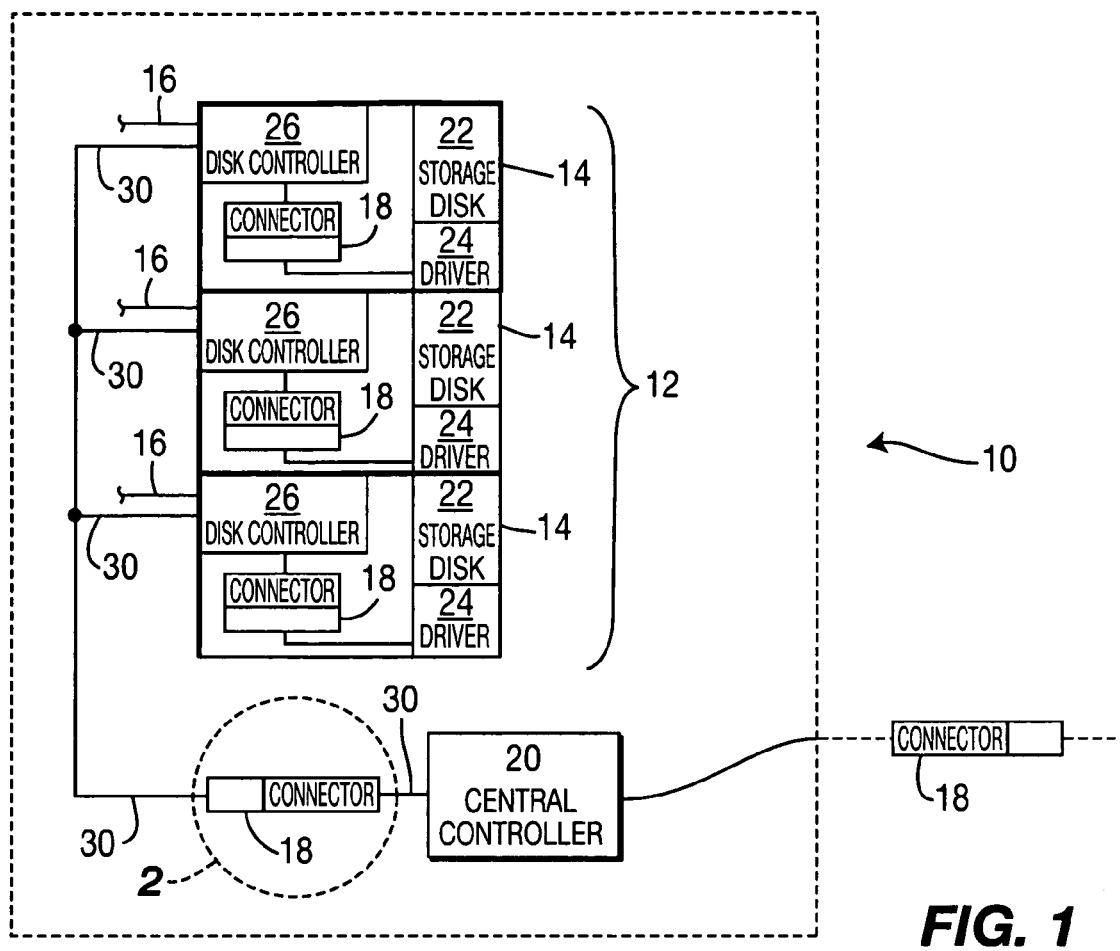
FIG. 1 is block diagram illustrating a protectable data storage system according to a preferred embodiment of the present invention.

Referring to FIG. 1, a protectable data storage system is shown and generally designated as 10. Briefly speaking, the present invention is directed to a protectable data storage system that can physically disconnect and isolate one or more data storage disks 22 of a disk system 12 when the data storage system 10 does not need to transfer data to and/or from the isolated disks 22. Thus, the disk storage of the present invention can be advantageously used in conjunction with computer applications, such as library applications, that use infrequent access patterns which permit the data storage system 10 to spin down the data storage disks 22 that are not in use.

The spinning down of unused disks 22 allows the data storage system 10 to reduce the power requirements of the disk system 12. The spinning down of disks 22 also protects the disks 22 from power surges and viral infections that may invade an attached computer network or application that is attached to the data storage system 10.

The disk system 12 preferably includes a plurality of disk modules 14. Although three disk modules 14 are shown, the present invention is intended to work with disk systems 12 having any number of disk modules 14.

The central controller 20 preferably sends data and power control instructions to each of the disk modules 14. In addition to sending instructions, the central controller can also send power and/or data to the disk modules 14 without departing from the scope of the present invention.

Each disk module 14 preferably includes a disk 22, a disk driver 24, and disk controller 26. Each disk module 14 receives at least one conduit 16 that supplies power and/or digital data to the disk module 14. Although the individual conduits 16, the system conduit 30, and the storage system conduit are shown as single input/output (I/O) lines for convenience, they can include at least one data line and at least one power line without departing from the scope of the present invention.

The disk controller 26 regulates the power and/or digital data supplied to the disk module 14. It is preferable that at one least one connector mechanism 18 is disposed in each of the plurality of disk modules 14 between the disk controller 26 and the disk driver 24. It is preferred, but not necessary, that the connector mechanism 18 is a solenoid. The connector mechanism 18 is capable of establishing electrical communication between the disk controller 26 and the disk driver 24 and also providing physical isolation.

Figure 2:
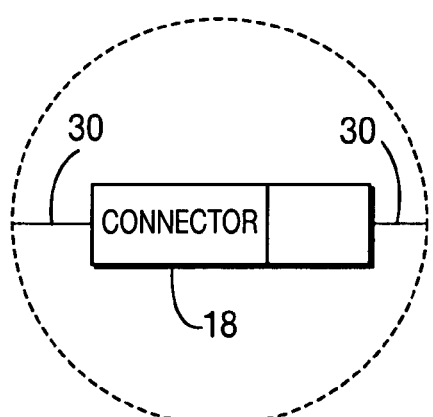
FIG. 2 is an enlarged view of the area of FIG. 1 identified by the numeral 2 in FIG. 1 and illustrates a connector mechanism in a first position for establishing electrical communication between two components of the data storage system of FIG. 1.
Figure 3:
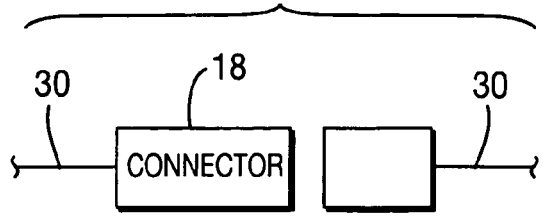
FIG. 3 is an enlarged view similar to that of FIG. 2 illustrating the connector mechanism of FIG. 2 in a second position illustrating the connector mechanism in a second position in which the mechanism physically disconnects two components of the data storage system from each other.

The at least one connector mechanism 18 is moveable between a first position (similar to that shown in FIG. 2), in which the disk controller 26 and the disk driver 24 are in electrical communication, and a second position (similar to that shown in FIG. 3), in which the disk controller 26 is physically disconnected from the disk driver 24. The connector mechanism 18 can be moved between the first and second positions via a manual switch, an electrical switch, and/or automatically moved by the data storage system controller or the like. Those of ordinary skill in the art will appreciate that any other known means of controlling the positioning of the connector mechanism 18 can be used without departing from the scope of the present invention.

When the connector mechanism 18 physically disconnects the disk controller 26, power and/or digital data is prevented from reaching the disk driver 24 and data is prevented from being transferred between the disk 22 and the at least one conduit 16. Those of skill in the art will appreciate from this disclosure that the at least one conduit 16 can be separate from a system conduit 30 or can be integrated into the system conduit 30 without departing from the scope of the present invention. Accordingly, the term "at least one conduit," as used in the claims and the corresponding portions of the specification, means "any one of the at least one conduit and the at least one system conduit." It is preferable that one connector mechanism 18 be disposed in each disk module 14 between the disk controller 26 and the disk driver 24.

It is also preferable that the central controller 20 regulates the disk system 12 to maintain a minimum number of the connector mechanisms 18 in the first position so that each disk 22 is only in communication with its respective disk controller 26 when information is being transferred to and/or from the disk 22.

A second embodiment of the present invention is directed to a protectable data storage system 10. Unless otherwise described below, the second embodiment of the disk storage system 10 is the same as that described above in connection with the first embodiment. In fact, the two embodiments can be combined, as shown in FIG. 1, without departing from the present invention. The second embodiment of the storage system 10 includes the disk system 12 for storing data and a central controller 20 that regulates the disk system 12. The central controller 20 is in detachable electrical communication with the disk system 12 via at one least system conduit 30.

In this embodiment, at least one connector mechanism 18 is disposed on the system conduit 30 between the disk system 12 and the central controller 20. The connector mechanism 18 is capable of establishing and de-establishing electrical communication between the disk system 12 and the central controller 20.

When the connector mechanism 18 is in the first position (shown in FIG. 2), the disk system 12 and the central controller 20 are in electrical communication. Those of ordinary skill in the art will appreciate from this disclosure that these instruction signals can be power signals and/or data signals that are used to operate the disk system 12.

Accordingly, the system 10 of the present invention can have individual disk modules 14 that receive instructions, power and data signals from the central controller 20 via a single conduit (e.g., system conduit 30) as described with reference to the second embodiment or from multiple conduits (e.g., a system conduit 30 and at least another conduit 16) as described with reference to the first embodiment.

A first preferred method of the present invention protects the storage disks 22 of and manages the power consumption of a data storage system 10 as follows. The first preferred method includes the step of providing a disk system 12 that includes a plurality of disk modules 14 (and preferably also includes a reserve capacity). Each disk module 14 contains a disk controller 26 and a disk driver 24. The disk driver 24 is in detachable electrical communication with the disk controller 26.

The first preferred method includes physically disconnecting the disk controller 26 from the disk driver 24 for any of the disk modules 14 that are not required by the data storage system 10 for the transfer of data. In addition to reducing power consumption, the first preferred method is especially suited for use with applications having infrequent storage disk 22 access times that do not require that the disk system 12 operate at full capacity on a regular basis.

The first preferred method also allows, in some cases, smaller power supplies to be used in conjunction with the disk system 12 than would otherwise be necessary. In those cases where the disk system 12 does not need to operate at full capacity during use, the first preferred method allows the disk storage capacity of an existing disk system 12 to be increased without necessarily requiring an increase in the system power supply.

For example, if the data storage system 10 only accesses twenty percent (20%) of the disk drives at any one time, then a single small power supply capable of operating twenty percent (20%) of the disk modules 14 (plus a reserve capacity) can be used with the system 10. Alternatively, two ten percent (10%) capacity power supplies could be used with the same system 10 to allow incremental power up and power down capability depending upon the percentage of the disk system 12 being used for data transfer.

If two ten percent (10%) capacity power supplies are used, then any disk drive load between zero (0%) and ten percent (10%) of the disk system 12 capacity would be powered by the first power supply. Should demand require it, the second power supply would be used to provide additional power for any disk drive load between ten (10%) and twenty percent (20%) of the total disk system capacity. A statistical analysis of the system usage could be performed regarding the total capacity required and the incremental capacity, and the required power supplies could be provided as desired. For example, if the total capacity required is eighty percent (80%), four (4) twenty percent (20%) power supplies could be provided, or one fifty percent (50%) and three (3) ten percent (10%) power supplies.

Those of skill in the art will appreciate that any other combination of power supplies can be used to achieve the desired system performance without departing from the scope of the present invention. However, when the method of the present invention is used with applications that commonly require full capacity operation of the disk system 12, then it is preferable to use a single power supply capable of powering all of the disk modules 14 simultaneously.

Whether power consumption is reduced by terminating power to the entire disk system 12, or by incrementally stepping down the power supplied to the disk system 12 depending on the percentage capacity of the disk system 12 being used, the reduced system power consumption is beneficial. By spinning down disks 22 during periods of non use, the life span of the disks 22 and the disk drivers 24 are increased. Furthermore, by increasing the periods of data disconnection between the disks 22 and the data storage system 10, the possibility of data corruption due to a system crash or viral contamination due to a virus penetrating a network attached to the data storage system 10 is reduced. Any virus transmitted to the data storage system 10 would be unable to affect the disks 22 when the disks 22 are physically disconnected from the conduits 16 or 30 through which data is transferred.

The second preferred method of the present invention includes providing a disk system with a central controller 20 that is in detachable electrical communication with the disk system 12. The central controller 20 regulates the power and/or data transfer to the disk system 12. The second preferred method includes physically disconnecting the disk system 12 from the central controller 20 when data transfers to and/or from the disk system is not needed.

The above-described methods and systems of the present invention provide many advantages. By limiting disk module 14 activity, the long term reliability of the data protection disks 22 is improved due to reduced thermal stress and reduced wear on the drive bearings. Additionally, by reducing the disk module heat emissions, more disks 22 can be located within a given volume of space, thereby resulting in reduced energy and equipment costs (particularly air conditioning requirements), improved energy efficiency and (optionally) the use of smaller power supplies. By maintaining complete isolation between storage disks 22 and the storage system 10 during periods of non-usage, maximal protection from power surges and computer viruses is assured.

It is further recognized by those skilled in the art, that changes may be made to the above-described embodiments of the present invention without departing from broad inventive concept thereof. It is understood, therefore, that this invention is not limited to the particular embodiments disclosed, but is intended to cover all modifications which are within the spirit and scope of the invention as defined by the appended claims.

What is claimed is:

1. A protectable data storage system, the system comprising:
a disk system comprising a plurality of disk modules, each disk module including a disk, a disk driver, and a disk controller wherein the disk driver is disposed between the disk controller and the disk;
at least one power supply coupled to each disk module, wherein a total amount of power that can be generated from the at least one power supply is less than an amount of power required to power all disk modules in the disk system;

at least one conduit that supplies at least one of power and digital data to each disk module, the disk controller regulates the at least one of power and digital data supplied to the disk module so that power is supplied for data transfer in increments less than a maximum disk system power level from the at least one power supply based on a percentage of capacity that is being used within the disk system; and at least one connector mechanism disposed within at least one of the plurality of disk modules between the disk controller and the disk driver, the at least one connector mechanism providing electrical communication between the disk controller and the disk driver, the at least one connector mechanism having a first position, in which the disk controller and the disk driver are in electrical communication, and a second position, in which the disk controller is physically and electrically disconnected from the disk driver preventing the at least one of power and digital data from reaching the disk driver and preventing data from being transferred between the disk and the at least one conduit.

2. The system of claim 1, wherein each connector mechanism is a solenoid.

3. The system of claim 1, wherein at least one connector mechanism is disposed in each disk module between the disk controller and the disk drive.

4. The system of claim 3, further comprising a central controller that regulates the disk system, the central controller maintaining a minimum number of the at least one connector mechanisms in the first position so that each disk is only in communication with the disk controller when information is being transferred between that disk and the central controller.

5. A protectable data storage system, the system comprising:

a disk system for storing data, wherein the disk system comprises a plurality of disk modules;

at least one power supply coupled to each disk module, wherein a total amount of power that can be generated from the at least one power supply is less than an amount of power required to power all disk modules in the disk system;

a central controller that regulates the disk system so that power is supplied for data transfer in increments less than a maximum disk system power level from the at least one power supply based on a percentage of capacity being used within the disk system, wherein the central controller is in detachable electrical communication with the disk system via at least one system conduit; and at least one connector mechanism disposed on the at least one system conduit between the disk system and the central controller, the at least one connector mechanism providing electrical communication between the disk system and the central controller, the at least one connector mechanism having a first position, in which the disk system and the central controller are in electrical communication, and a second position, in which the disk system is physically and electrically disconnected from the central controller preventing signals from being received by the disk system.

6. The system of claim 5, wherein each connector mechanism a solenoid.

7. A method of protecting and managing the power consumption of a data storage system, the method comprising:

providing a disk system including a plurality of disk modules, each disk module containing a disk, a disk controller and a disk driver, the disk driver being in detachable electrical communication with the disk controller, wherein the disk driver is disposed between the disk controller and the disk;

coupling at least one power supply to each disk module, wherein a total amount of power that can be generated from the at least one power supply is less than an amount of power required to power all disk modules in the disk system;

providing power for data transfer in increments less than a maximum disk system power level from the at least one power supply based on a percentage of capacity being used within the disk system; and physically and electrically disconnecting the disk controller from the disk driver for any of the plurality of disk modules that are not required by the data storage system for the transfer of data.

8. The method of claim 7, wherein the step of physically disconnecting the disk controller further comprises moving a solenoid from a first position, in which electrical communication is established between the disk controller and the disk driver, to a second position, in which the disk controller is disconnected from the disk driver.

9. A method of protecting a data storage system, the method comprising:

providing a disk system;

coupling at least one power supply to each disk module, wherein a total amount of power that can be generated from the at least one power supply is less than an amount of power required to power all disk modules in the disk system;

providing a central controller in detachable electrical communication with the disk system to regulate at least one of power and data transferred to the disk system so that power is supplied for data transfer in increments less than a maximum disk system power level from a the at least one power supply based on a percentage of capacity being used within the disk system; and physically and electrically disconnecting the disk system from the central controller when at least one of data transfer to and data transfer from the disk system is not needed.

10. The method of claim 9, wherein the step of physically disconnecting the disk system further comprises moving a solenoid from a first position, in which electrical communication is established between the disk system and the central controller, to a second position, in which the disk system is disconnected from the central controller.

11. A protectable data storage system, the system comprising:

a disk system for storing data;

at least one power supply coupled to the disk system, wherein a total amount of power that can be generated from the at least one power supply is less than an amount of power required to provide full power to the disk system;

a central controller that regulates the disk system so that power is supplied for data transfer in increments less than a maximum disk system power level from the at least one power supply based on a percentage of capacity being used within the disk system, wherein the central controller is in electrical communication with the disk system;

at least one storage system conduit in electrical communication with the disk system for transferring at least one of data to and data from the protectable data storage system; and at least one connector mechanism disposed on the at least one storage system conduit, the at least one connector mechanism providing at least one of electrical communication to and electrical communication from the protectable data storage system, the at least one connector mechanism having a first position, in which at least one of electrical communication to and electrical communication from the protectable data storage system is possible, and a second position, in which the protectable data storage system is physically and electrically isolated to prevent at least one of electrical communication to and electrical communication from the protectable data storage system.

12. The system of claim 11, wherein each connector mechanism is a solenoid.

13. A method of protecting a data storage system, the method comprising:

providing a data storage system having a disk system, a central controller, and at least one storage system conduit for transferring at least one of data to and data from the data storage system;

coupling at least one power supply to the disk system, wherein a total amount of power that can be generated from the at least one power supply is less than an amount of power required to provide full power to the disk system;

providing power for data transfer in increments less than a maximum disk system power level from the at least one power supply based on percentage of capacity being used within the disk system; and physically and electrically isolating the data storage system preventing at least one of data transfer to and data transfer from the data storage system by creating a physical gap in the at least one storage system conduit.

14. A method of managing the power consumption of a data storage system, the method comprising:

providing a disk system including a plurality of disk modules, each disk module containing a disk, a disk controller and a disk driver, the disk driver being in detachable electrical communication with the disk controller, wherein the disk driver is disposed between the disk controller and the disk;

coupling at least one power supply to each disk module, wherein a total amount of power that can be generated from the at least one power supply is less than an amount of power required to power all of the disk modules in disk system;

providing power for data transfer in increments less than a maximum disk system power level from a the at least one power supply based on a percentage of capacity being used within the disk system; and physically and electrically disconnecting the disk controller from the disk driver for any of the plurality of disk modules that are not required by the data storage system for the transfer of data to minimize power consumption by the data storage system.

15. The method of claim 14, wherein the step of physically and electrically disconnecting the disk controller further comprises moving a solenoid from a first position, in which electrical communication is established between the disk controller and the disk driver, to a second position, in which the disk controller is physically and electrically disconnected from the disk drive.

16. The system of claim 1, wherein the disk controller is configured to reduce thermal wear and stress for each disk module and provide increased power efficiency.

17. The system of claim 5, wherein the central controller is configured to reduce thermal wear and stress to the disk system and provide increased power efficiency.

18. The method of claim 7, further comprising configuring the disk controller to reduce thermal wear and stress to the disk system and provide increased power efficiency.

19. The method of claim 9, further comprising configuring the central controller to reduce thermal wear and stress to the disk system and provide increased power efficiency.

20. The system of claim 11, wherein the central controller is configured to reduce thermal wear and stress to the disk system and provide increased power efficiency.

21. The method of claim 13, further comprising configuring the central controller to reduce thermal wear and stress to the disk system and provide increased power efficiency.

22. The method of claim 14, further comprising configuring each disk controller to reduce thermal wear and stress to the disk system and provide increased power efficiency.

23. The system of claim 5, wherein the central controller is configured to individually control the generation of power by each of the at least one power supply.

24. The method of claim 9, wherein the central controller is configured to individually control the generation of power by each of the at least one power supply.

25. The system of claim 11, wherein the central controller is configured to individually control the generation of power by each of the at least one power supply.

26. The method of claim 13, wherein the central controller is configured to individually control the generation of power by each of the at least one power supply.

27. The method of claim 14, wherein the central controller is configured to individually control the generation of power by each of the at least one power supply.

* * * * *